Nov. 4, 1969 R. NORTON Re. 26,704
FABRIC LOAD LIFTING SLING
Original Filed May 19, 1965 4 Sheets-Sheet 1
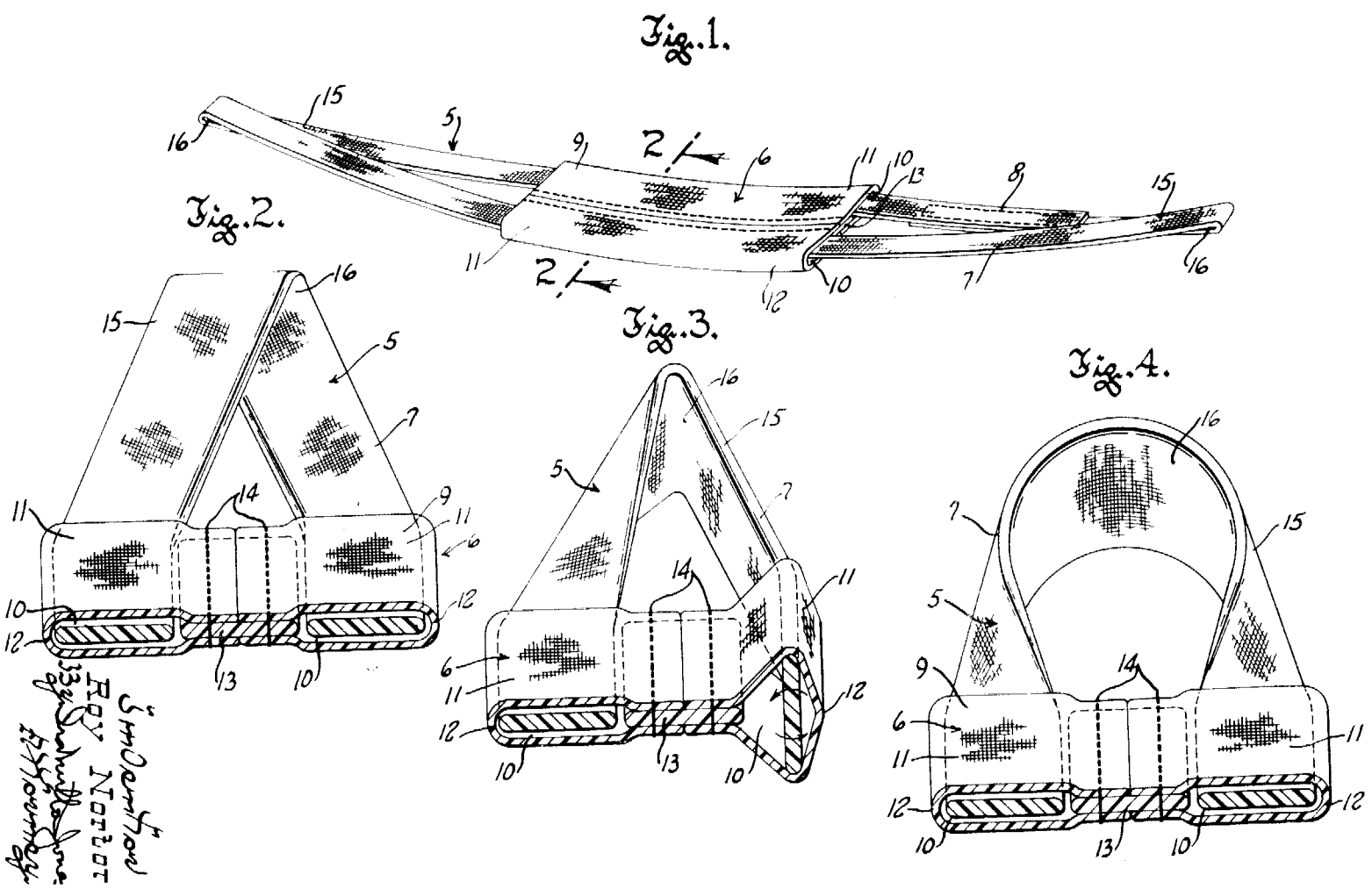

Nov. 4, 1969 R. NORTON Re. 26,704
FABRIC LOAD LIFTING SLING
Original Filed May 19, 1965 4 Sheets-Sheet 2
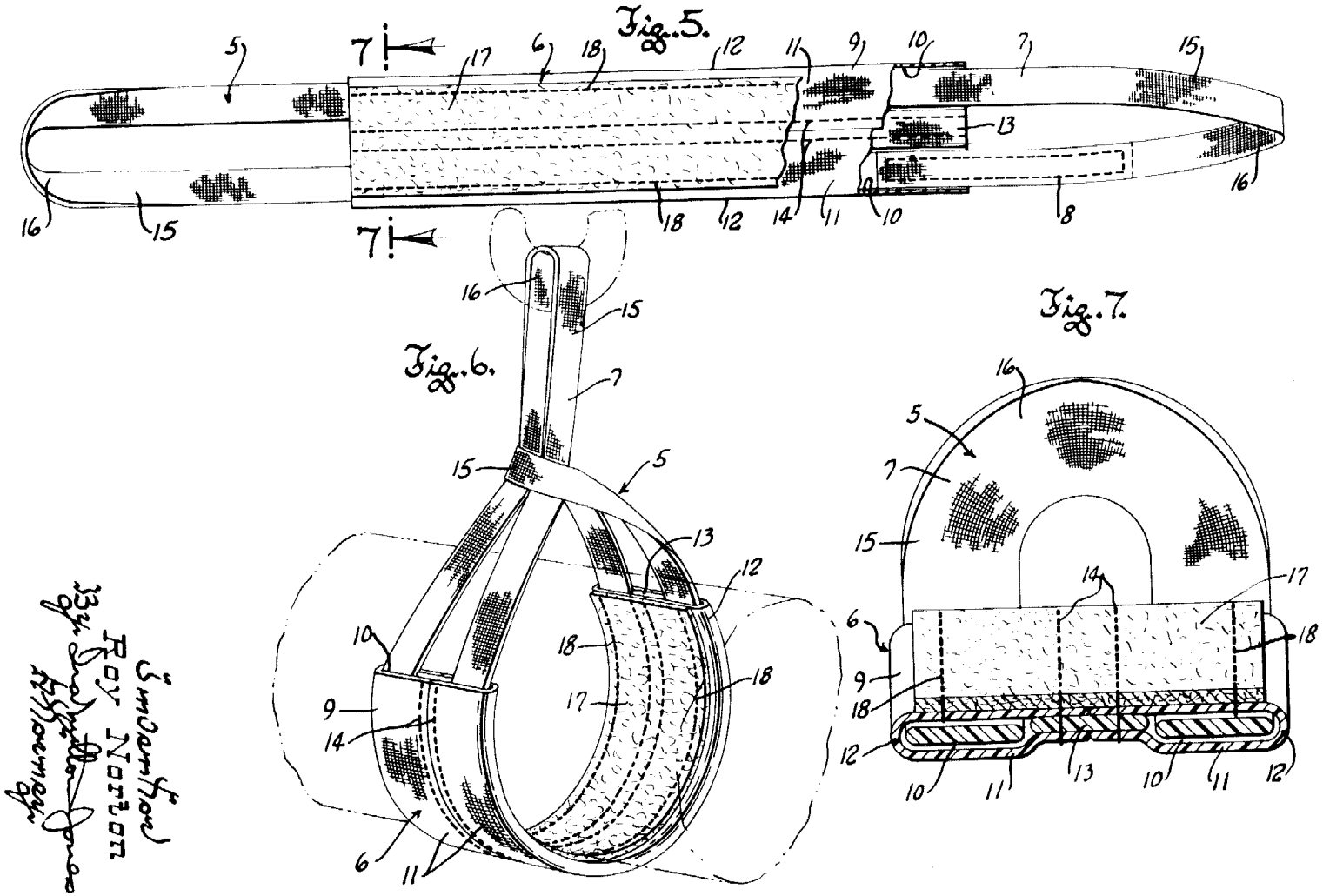
Inventor
Roy Norton
By Dwight Hilton Jones
Attorney Nov. 4, 1969 R. NORTON Re. 26,704
FABRIC LOAD LIFTING SLING
Original Filed May 19, 1965 4 Sheets-Sheet 3
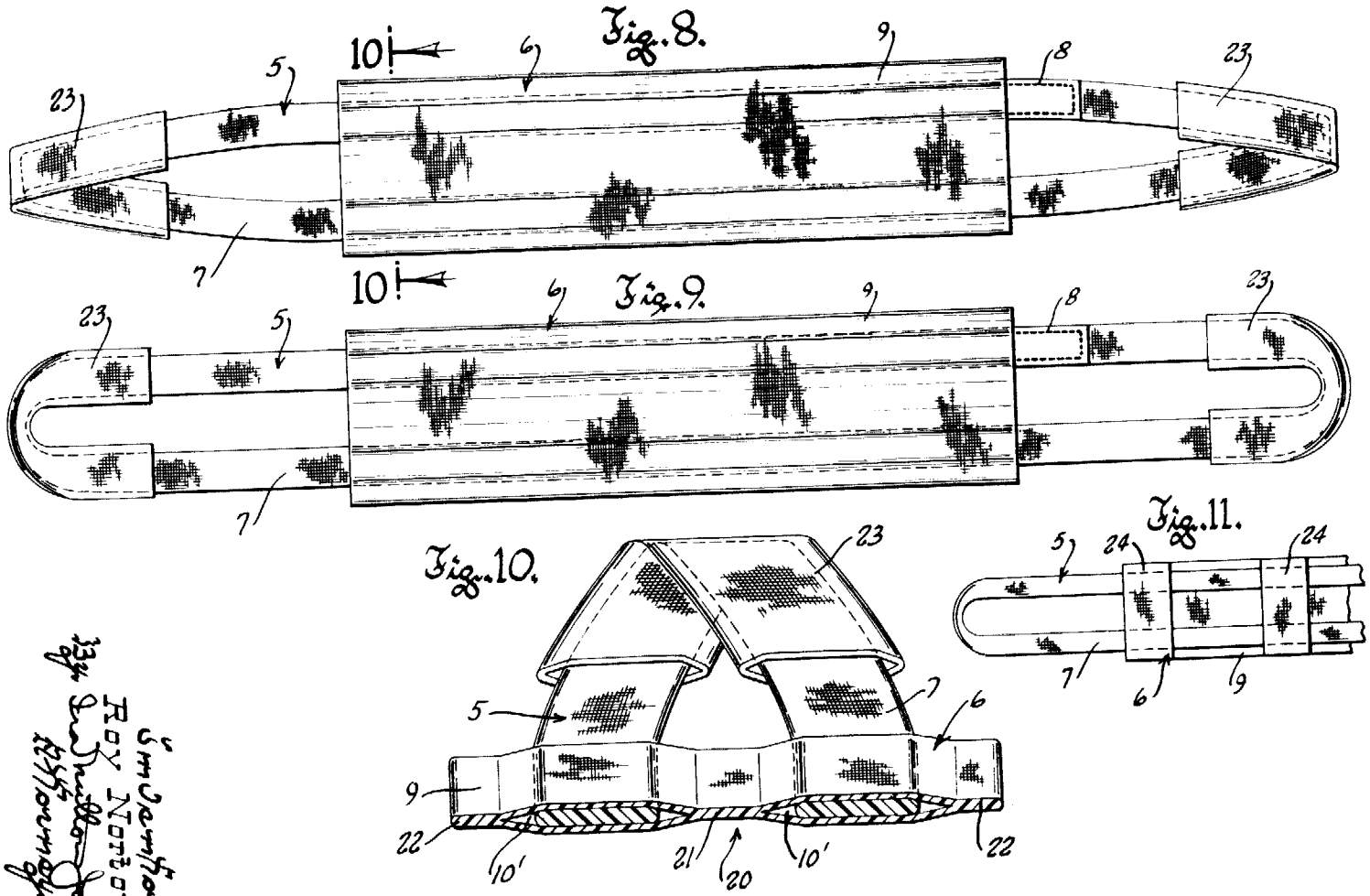
Inventor
Roy Norton
By Dwillon Jones
Attorney

FABRIC LOAD LIFTING SLING

Original Filed May 19, 1965 4 Sheets-Sheet 4

Inventor
Roy Norton
By Drs Hutton Jones
Attorneys

United States Patent Office

Re. 26,704
Reissued Nov. 4, 1969

26,704

FABRIC LOAD LIFTING SLING

Roy Norton, Milwaukee, Wis., assignor to The Wear-Flex Corporation, Milwaukee, Wis., a corporation of Wisconsin Original No. 3,290,083, dated Dec. 6, 1966, Ser. No. 457,086, May 19, 1965. Application for reissue Dec. 3, 1968, Ser. No. 786,498

Int. Cl. B66c *1/12*

U.S. Cl. 294—74 15 Claims

Matter enclosed in heavy brackets [ ] appears in the original patent but forms no part of this reissue specification; matter printed in italics indicates the additions made by reissue.

*ABSTRACT OF THE DISCLOSURE*

*A load lifting sling of nylon webbing in which the load contacting portion and the load carrying portion are slidably connected to permit relative movement therebetween so the inevitable stretching of the load carrying portion of the sling as a load is lifted in nowise affects the load contacting portion.*

This invention relates to load lifting slings used with cranes and other hoists, and refers more particularly to slings made of fabric webbing. Such slings have many advantages over the more conventional chain, wire cable and rope slings, especially for handling loads which must be protected against being scratched or marred—as, for instance, finely finished machine parts.

Fabric load lifting slings heretofore available generally have consisted of an elongated body portion formed of several layers or thicknesses of fabric webbing and looped end portions also formed of fabric webbing, projecting from the opposite ends of the body portion. The looped end portions were sewed to the body portion so that all parts of the sling were permanently joined together and secured against relative movement.

The looped end portions of the sling provided eyes to receive the crane hook or, if the sling was used as a choker hitch, one end portion of the sling was passed through the eye at its opposite end and then attached to the crane hook. The eyes were either of the flat type wherein the two stretches of the loop which form the eye lie flat upon one another and the axis of the eye is parallel to the top and bottom surfaces of the body portion; or of the so-called reversed or open type in which the axis of the eye is perpendicular to the top and bottom surfaces of the body portion and the eye normally assumes an open condition.

Each eye type has advantages that the other lacks. The flat eye is easier to slip under a load since it requires less clearance between the bottom of the load and the floor. The reversed or open eye is better adapted for use of the sling in a choker hitch. The sling of the Barthule Patent No. 2,903,291, is an example of the reversed eye type, and is also representative of the fabric slings heretofore available.

All prior fabric slings had limitations and objections which this invention overcomes. Thus, all parts of the sling of this invention, and especially all its lifting fibers and its splice, are fully and completely inspectionable by direct examination, whereas—in slings such as that of the aforesaid patent—much of the structure of the sling could not be examined.

Another advantage which the sling of this invention possesses over the prior fabric slings is that the part thereof which bears the load, and therefore is in tension and inevitably undergoes some stretch during use of the sling, is separate from the part of the sling which is in actual contact with the load. Hence, the load contacting part of the sling is never subjected to tensile stresses and does not stretch and move across the surface of the load as it would if it were sewed to the load bearing portion of the sling. Relative motion between the load and the part of the sling engaging it can mar a finely finished surface of a heavy load, and it definitely produces premature localized wear of the sling—especially if the load has sharp edges across which the sling passes.

Since the load contacting part of the sling is never subjected to tensile stress, the material of which it is made can be chosen for its abrasion and wear-resistant properties, which usually are not attributes of material possessing good tensile strength, and can be further buffered by a pad of more or less resilient material such as rubber or leather.

Another advantage of this invention over prior slings, and which stems from the fact that the load bearing part of the sling is not sewed to its load contacting or buffer portion, is that the eye-forming loops are not limited to localized portions of the load bearing part of the sling, but instead can be formed by any portion thereof. This gives the sling an infinite number of eye wearing points.

Still another advantage of the sling of this invention is that its eyes may be quickly and easily changed from one type to the other.

From the foregoing recitation of the many advantages of the sling of this invention over fabric slings heretofore available, it is evident that the purpose and object of this invention is to provide an improved fabric webbing sling and, more especially, a safer, longer wearing and more versatile sling of this type.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention, constructed according to the best modes so far devised for the practical application of the principles thereof, and in which:

FIGURE 1 is a perspective view of a fabric load lifting sling embodying this invention in one form thereof;

FIGURE 2 is a detail cross sectional perspective view through FIGURE 1 on the plane of the line 2—2;

FIGURES 3 and 4 are views similar to FIGURE 2, illustrating the manner in which one stretch of the endless loop of webbing which forms the load bearing part of the sling can be rotated or turned to convert the eyes formed by the loops at the ends of the sling from one form to the other—in this case, from the flat eye shown in FIGURE 2 to an open eye shown in FIGURE 4;

FIGURE 5 is a plan view of a load lifting sling embodying this invention in a somewhat modified form which is characterized by the fact that the eye at one end of the sling is of one type, while the eye at the other end is of the other type, and by the provision of a special cushioning pad on the load contacting or buffer part of the sling;

FIGURE 6 is a perspective view illustrating the sling of FIGURE 5 in use as a choker hitch;

FIGURE 7 is a detailed cross sectional view through FIGURE 5 on the plane of the line 7—7;

FIGURES 8 and 9 are plan views of slings embodying this invention in still another form, FIGURE 8 showing this sling having its looped ends disposed to form flat eyes, and FIGURE 9 showing the same having its looped ends disposed to form open eyes;

FIGURE 10 is a detail cross sectional perspective view taken through FIGURE 8 on the plane of the line 10—10;

FIGURE 11 is a fragmentary plan view at a reduced scale, illustrating another modified embodiment of the invention.

Figure 12:
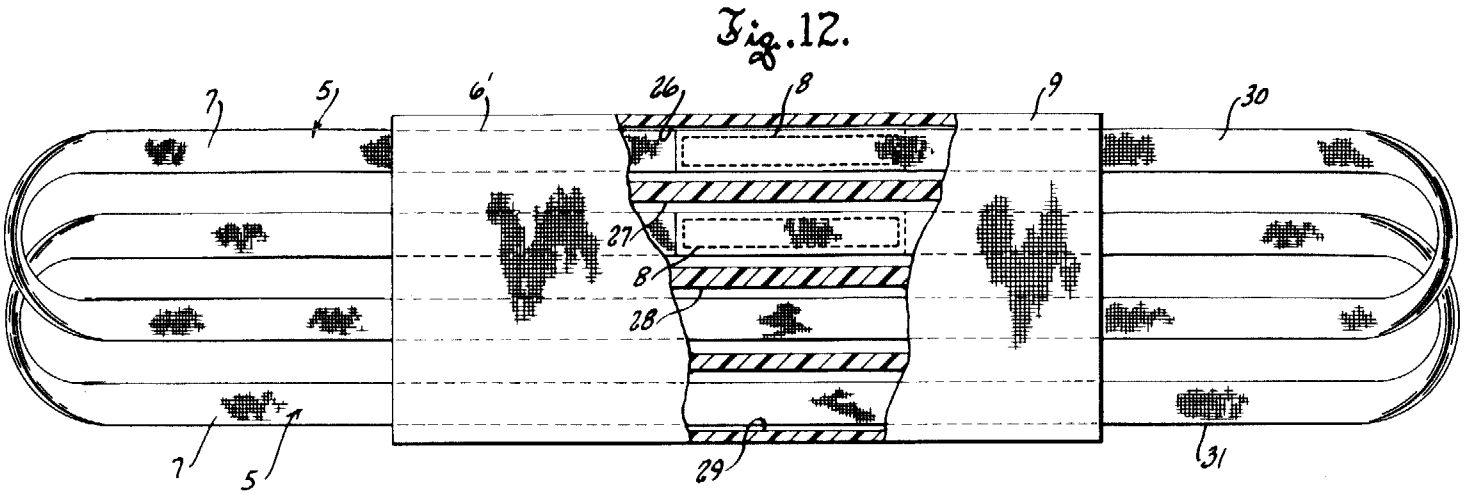
FIGURES 12 and 13 are plan views of a sling embodying the invention in a form which is characterized by the fact that it has two eyes at each end.

From the accompanying drawings, to which reference is now made, it will be seen that the load lifting sling of this invention comprises a load bearing part 5 and a load contacting or body part 6. The load bearing part 5 is an endless band 7 of fabric webbing formed by splicing or securely fastening together the end portions of a length of suitable webbing, as by stitching 8. Nylon webbing is preferably used for the load bearing part of the sling because of its very high tensile strength.

The load contacting or body part 6 is an elongated flexible rectangular member 9 with generally parallel top and bottom surfaces, parallel side edges and laterally adjacent belt tunnels 10 extending lengthwise thereof. It is assembled and connected with the load bearing part 6 by having opposite stretches of the endless band 7 freely slidably received in its tunnels 10. The two parts of the sling are thus freely movable with respect to one another lengthwise of the sling.

In that form of the invention shown in FIGURES 1–7, inclusive, the member 9 is formed by two uniform width pieces of fabric 11, each folded upon itself, as at 12, along substantially its longitudinal center line, and a strip of webbing 13 sandwiched between and secured to the longitudinal edge portions of the overlying halves of these folded pieces of fabric by rows of stitching 14. The assembly is symmetrical so that one half of the strip 13 is confined between the longitudinal edge portions of each of the two folded pieces 11, and since the side edges of the strip are spaced from the folds 12, the strip coacts with the pieces 11 to define the laterally adjacent tunnels 10.

The looped portions 15 of the endless band 7 which project beyond the ends of the member 9 from eyes 16, the axes of which are either parallel or perpendicular to the general plane of the member 9, depending upon the rotational orientation of the two stretches of the endless band that are in the tunnels. An eye which has its axis parallel to the general plane of the member 9 (as in FIGURES 1 and 2) is known as a flat eye, the other (shown in FIGURE 4) is called a reversed or open type eye. As noted hereinbefore, each eye type possesses advantages which the other lacks. Hence, it is desirable to be able to convert the sling from a flat eye type to a reversed or open eye type, and vice versa. Comparison of FIGURES 2, 3 and 4, illustrates how easily this can be accomplished in the sling of this invention. As there shown, it is only necessary to turn or rotate one stretch of the endless band 180°; and although it may be possible to do this by simply grasping the band near the ends of the tunnel and applying torque to the band, it is easier to twist the band at one end of the tunnel and then pull the twisted portion of the band through the tunnel and out of its opposite end.

Inasmuch as the opposite stretches of the endless band are freely slidable endwise through the tunnels, it is evident that the load contacting part of the sling, i.e., the member 9, does not partake of any of the tensile stresses that are imparted to the band during use of the sling. The stretches of the band are free to stretch as they will when the sling is in use, especially if the band is made of Nylon webbing, but this stretching of the fibers of the band does not affect the member 9. Consequently, the load contacting part of the sling does not shift, rub or slide on the load which it engages. Not only does this assure against marring the surfaces of the load with which the sling is engaged, but it also prevents wear upon the band.

The freely slidable relationship between the load contacting part of the sling and the endless load carrying band also makes it possible to distribute the wear which results from engagement between the eyes of the sling and the crane hook uniformly along the entire length of the band. Most important, however, it makes it possible to inspect and closely examine all load carrying portions of the sling. Hidden defects which could be sources of serious danger are thus virtually impossible with the sling of this invention.

In that form of the invention shown in FIGURES 5–7, inclusive, the ends of the length of webbing which forms the endless band 7 are joined together in reverse relationship from that shown in FIGURE 1. Accordingly, the eyes of this sling are always of opposite type. This arrangement is especially adavntageous when a choker hitch is employed in lifting the load, as shown in FIGURE 6.

One of the features of the invention which is made possible by the fact that the load contacting part of the sling is actually separate from the load bearing part, and hence not subjected to tensile stresses, is the fact that the load contacting part can be equipped with a cushioning pad 17, as shown in FIGURES 5, 6 and 7. Such a pad may be formed of rubber, leather, or other resilient material and may be secured to the member 9 by first sewing each piece of fabric 11 to the pad 17 by a row of stitches 18, which is done before the pieces 11 are folded upon themselves, and then completing the assembly as hereinbefore described, with the stitches 14 passing through the cushioning pad 17.

The embodiment of the invention illustrated in FIGURES 8–10, inclusive, differs from those already described primarily in the construction of the load contacting part of the sling. In this case, instead of being built up of separate pieces, the entire load contacting part with its two side-by-side tunnels 10', is formed of one piece of woven tubing 20. [Opposite walls of this length of tubing are joined together along the longitudinal center line of the tubing, as at 21, and preferably the junction 21 is formed at the time the tubing is woven. Also, if desired and as shown in FIGURE 10, the outer edge portions 22 of the flattened tubing may be given a double thickness for strength.] *As best seen in FIGURE 10, the tubing 20 is so woven that the two side-by-side tunnels 10' are formed by separate plies of the tubing joined at their longitudinal edges by a band 21 which extends down the longitudinal center line of the load contacting part, and by bands 22 which define the side edges of the load contacting part. Not only does this construction define and separate the two tunnels 10' from one another, but it also enables a cushioning pad such as the pad 17 of FIGURE 7 to be sewed to the tubing 20 without interfering with continuity of the tunnels 10', it being understood that the stitches that secure the pad to the tubing would be confined to the bands or marginal edge portions 22 and the medial portion or band 21.* In other respects the sling of FIGURES 8–10, inclusive, is the same as that previously described, except that for adequate protection to the eyes at the opposite ends of the sling, tubular reinforcing sleeves 23 are slidably fitted onto the looped end portions of the endless band 7.

In FIGURE 8, the band is so disposed in the tunnels that the eyes at the ends of the sling are of the flat type, whereas, in FIGURE 9, they are of the reversed or open type.

As will no doubt be readily appreciated, the tunnels 10 through which the two stretches of the endless band pass, need not be continuous from one end of the member 9 to the other. Portions thereof—at least at one side of the member 9—could very well be omitted or cut away to facilitate turning the band when it is desired to convert the sling from a flat eye-and-eye type to a reversed or open eye type. This possibility is illustrated in FIGURE 11, in which the tunnel means are formed by spaced apart straps 24 extends transversely across the member 9 with their medial portions, as well as their ends, secured thereto.

Figure 13:
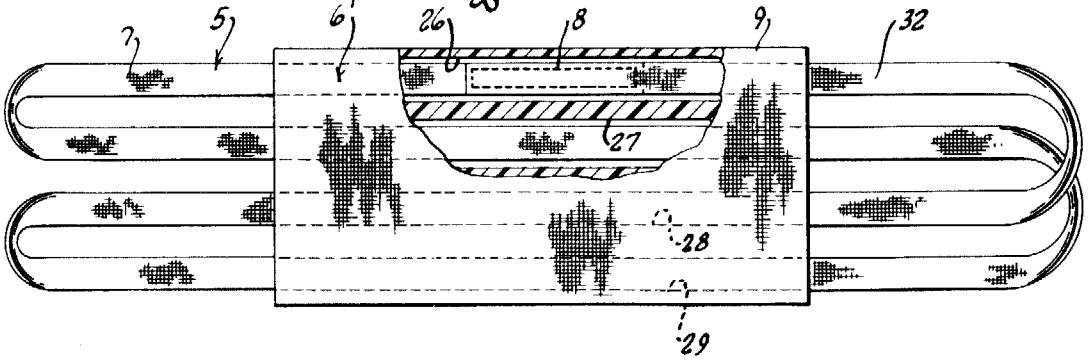

As shown in FIGURES 12 and 13, the sling of this invention may be embodied in a multiple form to provide a wider engagement with the load and increase the lifting capacity of the sling. Thus, as shown in FIGURE 12, the load contacting part 6' of the sling, which may be of the woven tubular type of FIGURES 9–10, inclusive, is simply made wider and instead of having two laterally adjacent tunnels, has four such tunnels 26, 27, 28 and 29. The tunnels 26 and 28 have the opposite stretches of one endless band 30 of Nylon or other suitable fabric slidably received therein, and the tunnels 27 and 29 have the two stretches of a second endless band 31 slidably received therein. Both bands are of the same length so that the eyes formed by their looped end portions can all be attached to the same crane hook with assurance that the load will be uniformly distributed between all four stretches of the bands.

The construction shown in FIGURE 13 differs from that of FIGURE 12 only in that a single endless band 32 is employed in lieu of the two bands 30 and 31. Thus the band 32 passes through the tunnel 26 into the tunnel 27, from it into the tunnel 29, and then from the tunnel 29 through tunnel 28 and back to the tunnel 26.

From the foregoing description taken in connection with the accompanying drawings, it will be apparent to those skilled in this art that this invention provides a significant improvement in fabric load lifting slings.

What is claimed as my invention is:

1. A load lifting sling comprising:

separate load bearing and load contacting parts, so assembled that regardless of how the sling is used to lift a load, the load bearing part is never subjected to abrasion or wear resulting from relative movement between it and the load, and the load contacting part is never subjected to tensile stress, the load bearing part comprising an endless band of fabric webbing having high tensile strength; and the load contacting part comprising an elongated member of relatively flexible material having good abrasision and wear resisting properties, substantially parallel top and bottom surfaces and parallel side edges, and having laterally adjacent tunnel means along the length thereof;

the endless band of fabric webbing which forms the load bearing part having opposite stretches thereof slidably received in said laterally adjacent tunnel means and having looped end portions projecting beyond the ends of the load contacting part and forming eyes by which the sling may be attached to a crane hook while the load contacting part engages a load to be lifted.

2. The load lifting sling of claim 1, wherein said tunnel means is continuous and extends from end-to-end of the load contacting part.

3. The load lifting sling of claim 1, wherein said tunnel means comprises spaced apart straps extending transversely across one surface of said elongated member, and having their ends and medial portions secured to said member.

4. The load lifting sling of claim 2, wherein said load contacting part comprises:

two uniform lengths of fabric, each of which is folded transversely upon itself about substantially its longitudinal center line;

a strap of flexible material having substantially half its width received between the longitudinal edge portions of one of said folded lengths of fabric, and substantially the remainder, thereof received between the longitudinal edge portions of the other of said folded lengths of fabric; and stitching securing the longitudinal edge portions of each of said lengths of fabric to one another and to the portion of the strap therebetween so that said folded lengths of fabric and the strap coact to form the laterally adjacent continuous tunnel means.

5. The load lifting sling of claim 1, wherein said tunnel means have normally flat sides in flat engagement with the opposite faces of the stretches of the endless band of fabric webbing received therein, but wherein said tunnel means are large enough in cross section and the walls thereof are flexible enough to permit the portion of the band therein to be pulled through the tunnel means in a twisted condition, whereby the band may be turned over so that the eye-forming loops may be disposed with their axes either perpendicular or parallel to the top and bottom surfaces of the body contacting part of the sling.

6. The load lifting sling of claim 1, further characterized by an abrasion and wear resistant tubular shield slidably embracing at least one of said looped end portions.

7. The load lifting sling of claim 2, wherein said load contacting part comprises a length of woven tubing having substantially flat opposite walls, and means securing the longitudinal medial portions of said opposite walls together to thereby divide the tubing into two adjacent tubes, each of which forms one of said tunnel means.

8. The load lifting sling of claim 7, wherein the medial portion of said opposite walls of the tubing are woven together to this effect the securement therebetween.

9. The load lifting sling of claim 2, wherein the load contacting part has four laterally adjacent tunnel means each slidably receiving a stretch of the load bearing part, and wherein the load bearing part has two eye-forming loops at each end of the sling.

10. The load lifting sling of claim 9, wherein the entire load bearing part consists of one endless band of fabric webbing doubled upon itself to form four stretches, each of which is received in one of the four tunnel means.

11. The load lifting sling of claim 9, wherein the load bearing part consists of two separate endless bands of fabric webbing, and wherein one stretch of each of said endless bands occupies a tunnel means lying between two other tunnel means.

12. The load lifting sling of claim 1, wherein the endless band of webbing which forms the load bearing part of the sling consists of a length of said webbing with the end portions thereof overlying and secured together.

13. The load lifting sling of claim 1, further characterized by a pad of non-scuffing but highly wear-resistant material secured to one surface of the load contacting part of the sling, to cushion its engagement with the load.

*14. The load lifting sling of claim 1, wherein said load contacting part is an integral woven tubular length of fabric and the laterally adjacent tunnels thereof are formed by separated plies of said woven tubular length of fabric, the plies being connected with one another at their longitudinal edges by bands of said fabric, said bands providing lengthwise extending portions on the load contacting part to which a cushioning pad may be secured without affecting the freedom of the tunnels to slidably receive stretches of the load bearing part.*

*15. As an article of manufacture, a load contacting part for a load lifting sling comprising:*

*an integral woven tubular length of fabric possessing good abrasion and wear resisting properties and having a pair of laterally adjacent tunnels extending for the full length thereof,*

*the walls of said tunnels being separated plies of said woven tubular length of fabric connected with one another along their longitudinal edges by a middle band of said length of fabric which lies between and connects the two tunnels, and by two side bands of said length of fabric,*

*all of said bands being coplanar when the length of fabric is lying flat, and the side bands defining the longitudinal marginal edges of said length of fabric.*

References Cited

The following references, cited by the Examiner, are of record in the patented file of this patent or the original patent.

UNITED STATES PATENTS

| | | | |
|---|---|---|---|
| 1,168,802 | 1/1916 | Harrison | 294—74 |
| 1,314,397 | 8/1919 | Heffron | 294—74 |

HARVEY C. HORNSBY, Primary Examiner